United States Patent [19]

Tomaszewski

[11] Patent Number: 5,918,192
[45] Date of Patent: Jun. 29, 1999

[54] METHOD FOR CALIBRATING A DIGITAL CAMERA TO A PC MONITOR TO ENHANCE PICTURE QUALITY OF A PICTURE CAPTURED BY THE DIGITAL CAMERA AND DISPLAYED ON THE PC MONITOR

[75] Inventor: Edward P. Tomaszewski, Phoenix, Ariz.

[73] Assignee: Intel Corporation, Santa Clara, Calif.

[21] Appl. No.: 08/787,865

[22] Filed: Jan. 23, 1997

[51] Int. Cl.⁶ .................................................. G01K 19/00
[52] U.S. Cl. ........................... 702/85; 348/231; 348/333; 358/504; 358/909.1
[58] Field of Search ........................ 364/571.07, 571.04; 358/504, 909.1; 348/231, 233, 267, 333, 334, 552, 190

[56] References Cited

U.S. PATENT DOCUMENTS

| | | | |
|---|---|---|---|
| 4,754,329 | 6/1988 | Lindsay et al. .......................... | 358/139 |
| 4,928,300 | 5/1990 | Ogawa et al. ............................. | 379/53 |
| 5,574,664 | 11/1996 | Feasey ..................................... | 702/107 |
| 5,606,365 | 2/1997 | Maurinus et al. ...................... | 348/222 |
| 5,633,678 | 5/1997 | Parulski et al. ......................... | 348/232 |

*Primary Examiner*—John Barlow
*Assistant Examiner*—Shah Kamini
*Attorney, Agent, or Firm*—Blakely, Sokoloff, Taylor & Zafman LLP

[57] ABSTRACT

Images captured by a digital camera can be enhanced to account for distortions due to the camera itself and due to the monitor on which images will be displayed. First, a camera basis set, which is the response of the camera to a reference monitor when pixels are illuminated thereon, is constructed. The camera basis set will not change for a given camera. For a given end-user monitor, calibration software likewise constructs a display basis set. The display basis set will not change for a given monitor. Capture images are thereafter enhanced by first curve fitting the captured image to the camera basis set, which results in a coefficient space. The coefficient space is applied to the display basis set to construct the enhanced image which is output to the monitor.

14 Claims, 6 Drawing Sheets

METHOD FOR CALIBRATING A DIGITAL CAMERA TO A PC MONITOR TO ENHANCE PICTURE QUALITY OF A PICTURE CAPTURED BY THE DIGITAL CAMERA AND DISPLAYED ON THE PC MONITOR

BACKGROUND OF THE INVENTION

1. Field of the Invention

The invention relates generally to digital imaging technology. More specifically, the invention relates to digital cameras used with computer systems.

2. Description of Related Art

A digital camera is capable of capturing a photograph of surroundings to which it is pointed and generating a digital image (bitmap) which can then be downloaded to a computer system or the like. Therefore, a digital camera can be tethered to some port of the computer system, whereupon the computer system, using a display controller, outputs the bitmap from the camera to a display device (monitor) connected to the computer system.

The key to capturing and displaying a good quality image is to calibrate the camera to such a monitor so that two classes of potential distortions in the image are corrected. The first is distortion due to the components of the digital camera itself, such as the lens system or imaging sub-system. The second distortion may be due to peculiarities/resolution of the monitor and/or display controller. Traditionally, digital camera manufacturers have only attempted to correct for the distortion of camera components and have entirely ignored distortion on the monitor. But, these attempted corrections have only been improvements in the quality and features of the lens, lighting, shutter etc., such that, given cost constraints and target market, one digital camera may be of poorer quality than the other. Further, by ignoring monitor-class distortion, even high quality cameras yield results dependent entirely upon the monitor features and quality, which may adversely impact the final image displayed.

Thus, there is a need to programmably calibrate images generated by digital cameras to account for potential image distortions when displaying the images on a monitor. There is also a need to ensure that the calibration also accounts for distortions and reductions in image quality due to the imaging system of the digital camera itself.

SUMMARY

The invention provides a calibration apparatus and method for a digital camera tethered to a computer system and to an associated monitor that displays images generated by the camera.

First, the camera is calibrated to some reference monitor before it is shipped for consumer use. The camera is tethered to the computer so that the computer can control its operation. The camera is then positioned and focused in front of the monitor such the camera lens faces the monitor and such that the monitor's output is entirely capturable by the field of view of the camera. Calibration software is provided on the computer which is executed to illuminate the monitor one pixel or set of pixels at one shutter instance. The software records the response of the camera, based on the image of the illuminated pixel(s) that it recognizes. The response characteristics of the camera include, for instance, intensities, location, sigma (smearing) values and color. All pixels or set of pixels defining the monitor are similarly illuminated and their response recorded. The set of responses for the entire reference monitor forms a camera basis set. This camera basis set is then shipped with the camera to the end user.

Once the camera is shipped to the end user, the end user can calibrate the camera to the monitor used, thereby accounting for distortions due to the monitor. To calibrate to the monitor, the camera is tethered to the end user's computer so that the computer can control the positioning and operation of he camera to capture the entire viewable area of the monitor. Software will again illuminate a pixel(s) on the monitor and record the response of the camera. The software will use the newly captured basis set and the camera basis set to compute a display basis set.

Using the camera basis set and display basis set, a captured image may be enhanced by fitting the captured image to the camera basis set. The fitting operation is used to find a coefficient space for the image. The coefficient space is then applied to the display basis set to construct an enhanced image which can then be displayed on the monitor.

DETAILED DESCRIPTION OF THE INVENTION

Figure 1:
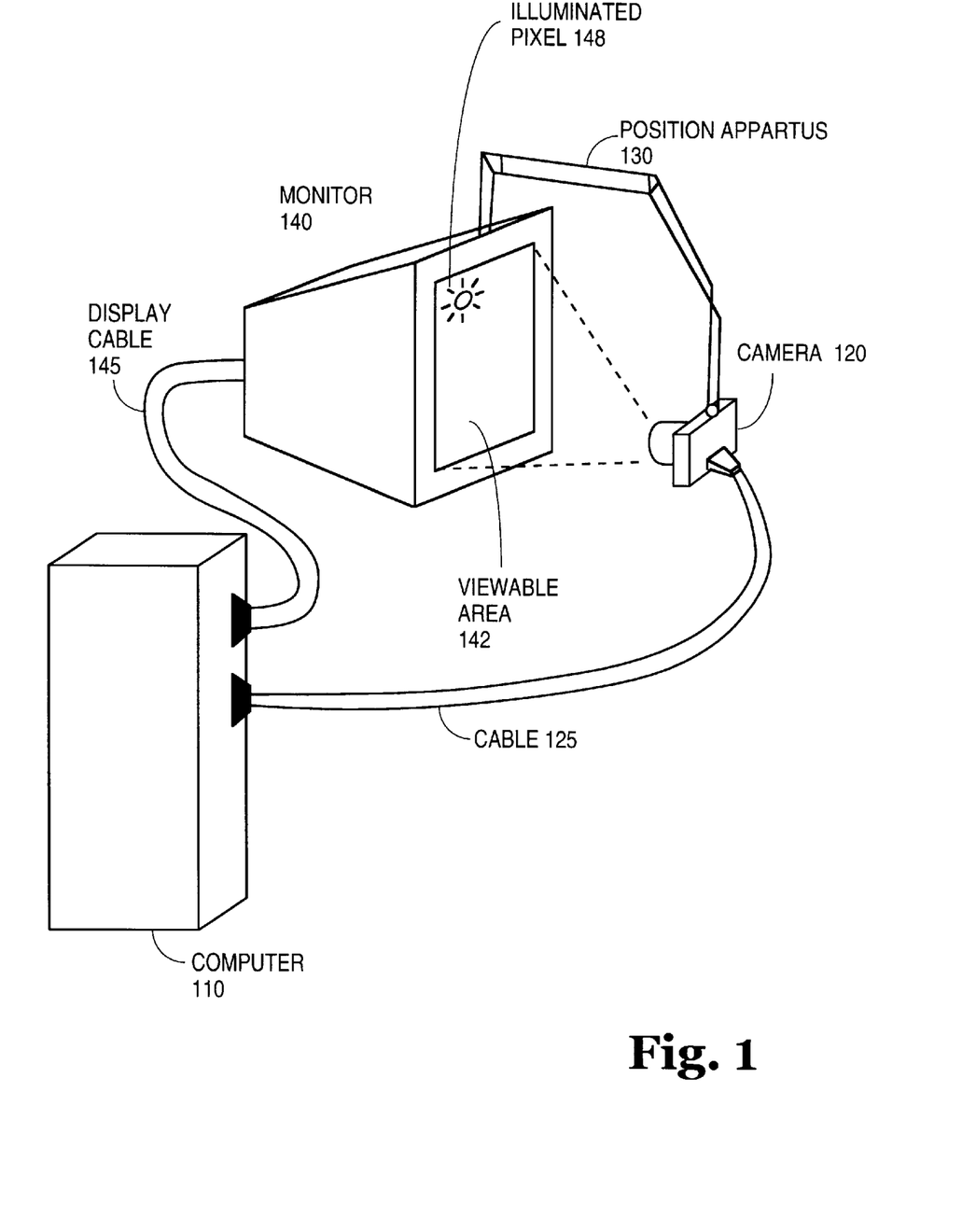
FIG. 1 is an illustration of the physical setup required for calibration according to one embodiment of the invention.

FIG. 1 is an illustration of the physical setup required for calibration according to one embodiment of the invention.

FIG. 1 shows a computer 110 and associated monitor 140 which is the computer's display device. Image information (bits representing pixels) is sent from a video controller (not shown) within computer 110 to monitor 140 through display cable 145 which couples the computer 110 with monitor 140. The monitor 140 has a viewable area 142 representing the entire front surface where pixels are output. A, "frame" of pixels, which is defined as the complete set of all pixels required to cover entirely the viewable area 142, is updated according to the refresh rate of the monitor and is updated when required (to change the image on the display etc.).

Also shown in FIG. 1 is a digital camera 120 which is tethered to computer 110 through a cable 125. Cable 125 is capable of transmitting information regarding captured images pass from camera 120 to computer 110. To keep the camera stable during the calibration procedure, a positioning apparatus 130 such as an adjustable cantilever or bracket can be affixed upon monitor 140 at one end and holds the camera 120 fixed at the other end using a clamping screw or other such mechanism (not shown).

Once the cables 145 and 125 have been connected and the camera 120 appropriately positioned, the computer 110 will run calibration software to control the camera and record responses from the camera 120. The calibration process implemented by the calibration software described below applies equally to calibration at the factory as well as for the end user. In the case of factory calibration, a certain reference monitor, preferably the highest quality monitor practicable will be used as monitor 140 so that camera distortions will be the dominant ones recorded.

When the monitor is turned on and the calibration software is executed by computer system 110, the camera 120, which is a digital camera capable of capturing and downloading images to a computer system 110, will focus on one pixel at a particular capture instance and "illuminate" the pixel. FIG. 1 shows an illuminated pixel 148 which is the top left hand corner pixel on the viewable area 142. The calibration software will control camera 120 to focus on and capture an image of the pixel 148. The software waits for the camera's "response" which will be a captured image representation of illuminated pixel 148. The software will record the response by measuring the intensities of each image for the illuminated pixel 148 and surrounding pixels. For instance, if a pixel at position (x,y) is illuminated, the actual response may show a bleed and thus, a spread of intensities in not only the (x,y) pixel, but surrounding pixels such as (x+1,y), (x−1,y) and (x+1,y+1) as well. The software stores the response data (by pixels and their intensities) in a data table in a memory of computer system 110 and the software then controls the camera to focus and capture the next pixel and record the next pixel's response. This process repeats until the responses for all the pixels on the viewable area 142 have been recorded. The set of responses for the entire viewable area represents the "camera basis set" for calibration performed at the factory and the "display basis set" for calibration performed by the end user. Using these basis sets, software can enhance the quality of captured images and optimize their appearance accounting for the peculiarities of monitor 140 and camera 120 as described below.

Figure 2:
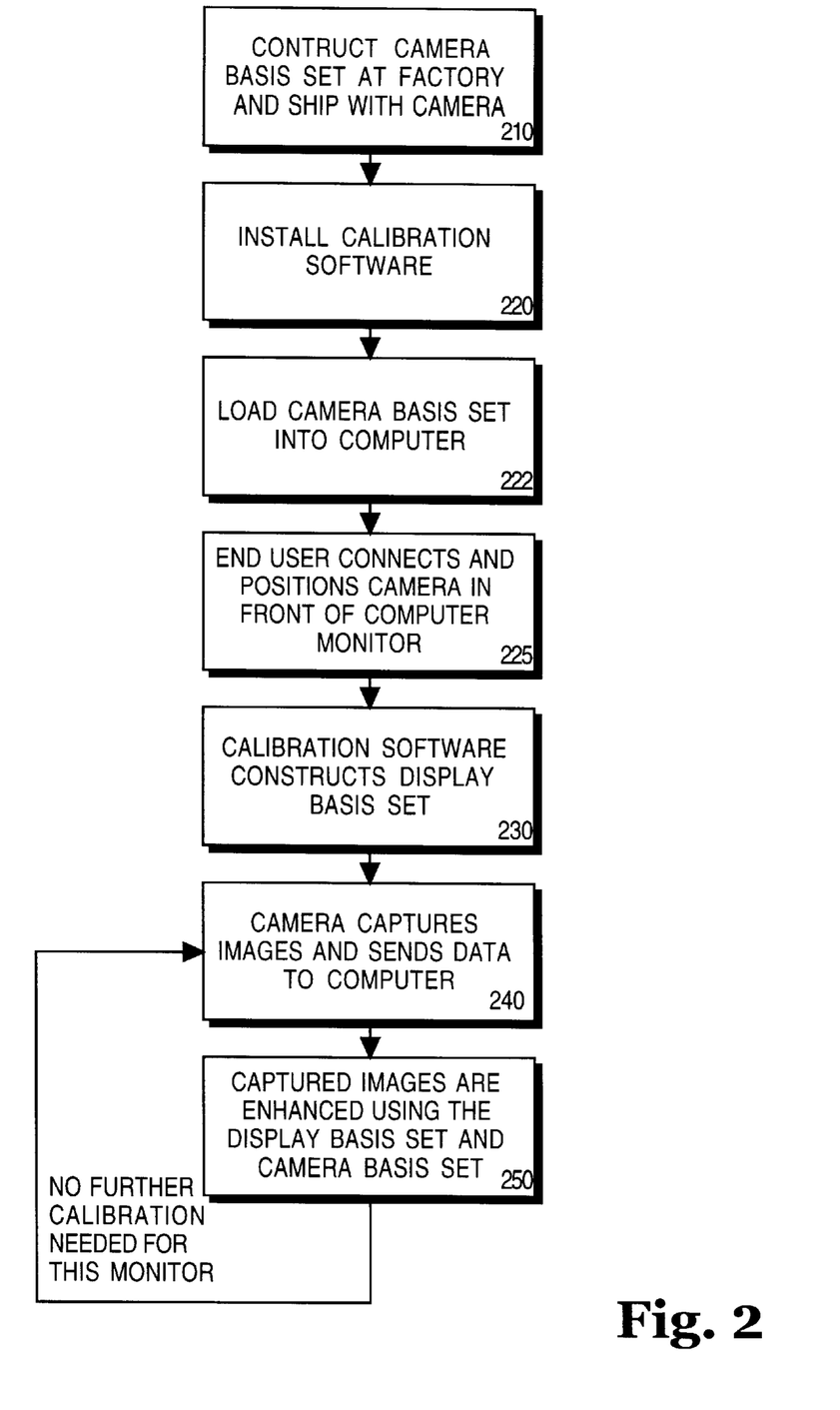
FIG. 2 is a flowchart of camera to monitor calibration and image enhancement according to one embodiment of the invention.

FIG. 2 is a flowchart of camera to monitor calibration and image enhancement according to one embodiment of the invention.

Figure 6:
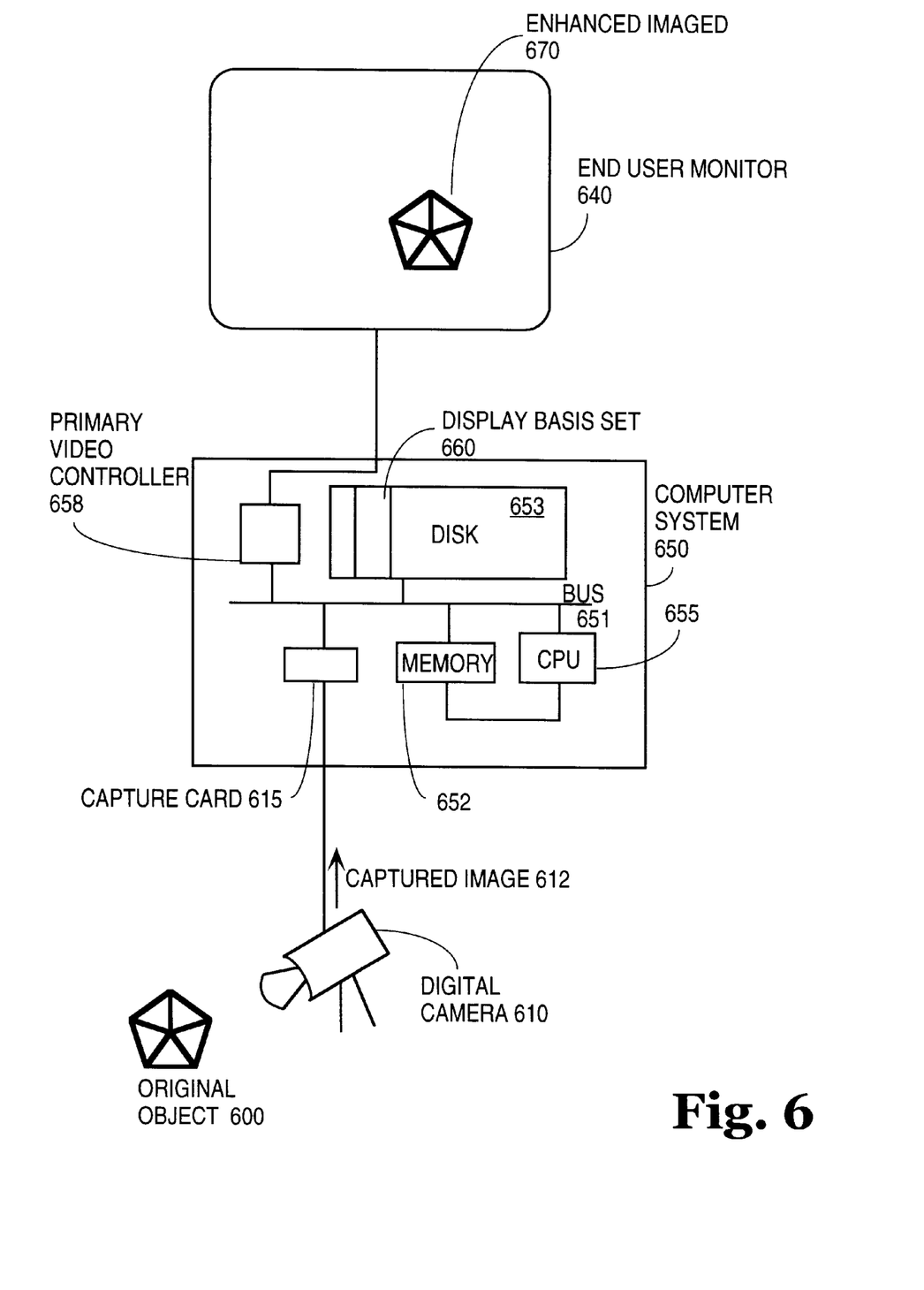
FIG. 6 illustrates a system diagram according to one embodiment of the invention.

At step 210, a camera basis set is first constructed as described above at the factory before the camera is shipped for sale or use. The camera basis set is the set of responses of the camera to an reference monitor and is intended to measure distortions in quality of captured images due to lensing, shutter or sensitivity peculiarities of the camera. The camera basis set is constructed as described above with reference to FIG. 1. The camera basis set also accounts for image distortions due to inherent errors of the imaging sub-system (i.e. digital signal processors, compression circuitry etc.) which represents the captured image for digital storage. Whatever the source of image distortion and loss of quality, the camera basis set, once constructed, records it. The camera basis set is stored on a disk 653 or other medium as shown in FIG. 6 so that the camera basis set accompanies the camera to the end user. For a particular camera, one camera basis set should last the life of the camera.

At step 220, an end user will have obtained the camera and will install calibration software on the end user's computer. The calibration software will first prompt the user to insert the disk shipped with the camera storing the camera basis set. When the camera basis set is loaded into the computer (step 222), the calibration software will prompt the user to unpack and position the camera in front of the monitor so that the field of view of the camera covers completely the viewable surface of the end user's monitor (step 225). Once the camera is appropriately positioned, the calibration software illuminates pixels on the end user monitor and constructs therefrom the display basis set (step 230) (see FIG. 3 and associated description below). The camera is then ready to capture images and then send the captured image data to the computer (step 240). From that point on, no further calibration is needed for the particular monitor for which the display basis set was constructed. According to step 250, the display basis set and camera basis set, which may be stored on a hard disk of the computer for convenience, is utilized to enhance images captured by the camera. The result of enhancement is an image which while distorted on capture, will be optimally enhanced for display on the monitor of the end user accounting also for distortions due to the quality of the camera.

Figure 3:
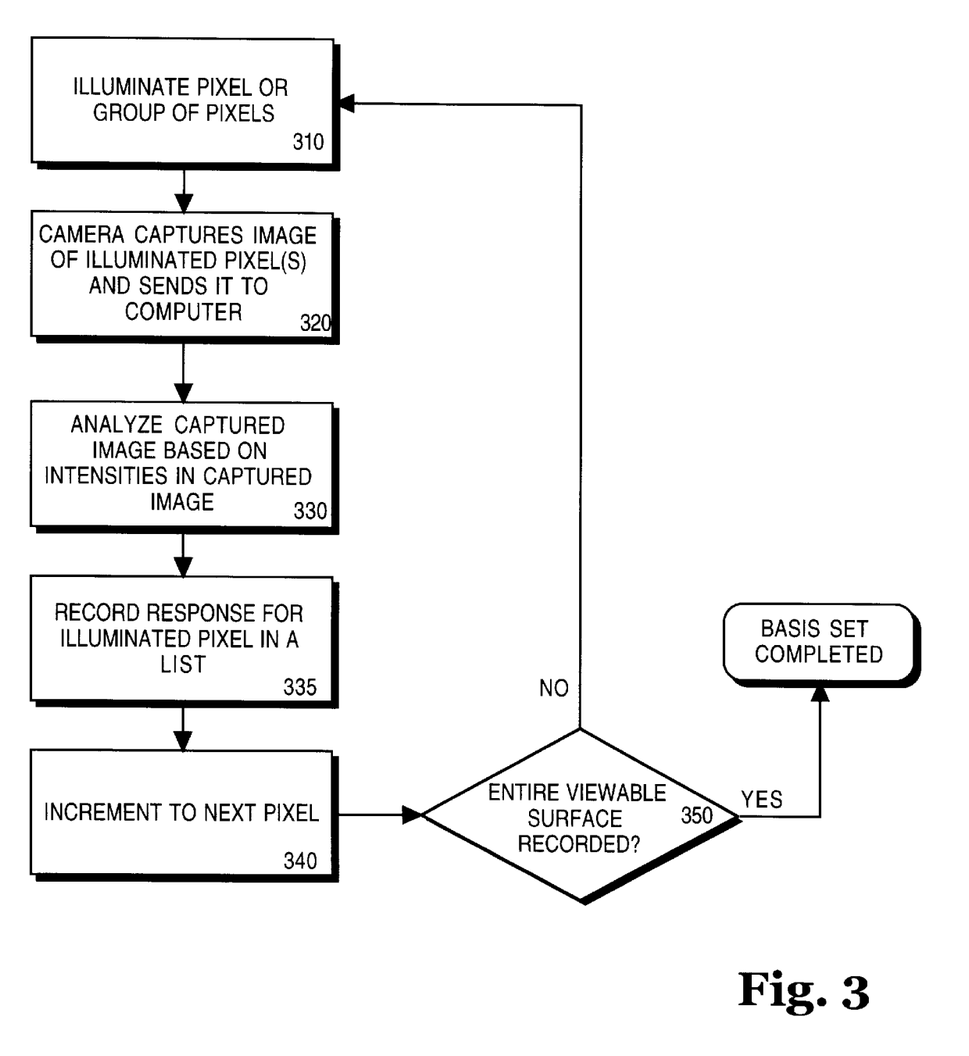
FIG. 3 is a flowchart showing the steps of constructing a camera basis set and also a display basis set.

FIG. 3 is a flowchart showing the steps of constructing a camera basis set and also a display basis set.

First, according to step 310, a pixel or group of pixels is illuminated (focused upon) by the camera. The camera then captures an image of that pixel or group of pixels and uploads the image to the computer (step 32)). The calibration software on the computer analyzes the image based on a reference constraint such as intensity for that pixel or group of pixels (step 330). The illuminated pixel will have an intensity value on the captured image. Other pixel locations surrounding the illuminated pixel may also have intensities even though they were not illuminated. This is due to the illuminated pixel being "smeared" or defracted across; neighboring pixels when captured by the camera. The intensity values are stored along with their pixel coordinates as numerical values in a linked list for each illuminated pixel. For each illuminated pixel location (x,y), a linked list of image pixel locations ($x_k$, $y_k$) and intensity $I_k$ (an intensity value each image pixel showing a greater than zero illumination) is stored. The set of all such linked lists represents the "response" or "basis set".

When the image of the captured pixel has been analyzed and the corresponding response stored in the appropriate list (step 335), the process repeats with a counter incrementing to the next pixel location (step 340). After step 340, steps 310–330 are repeated for the new pixel location. When all of the pixel locations are illuminated and their response recorded for the entire viewable surface of the monitor (checked at step 350), the procedure is considered complete. For calibration at the factory, this array of linked lists represents the camera basis set. However, the process in steps 310 to 340 are identical for calibration by the end user, where the resultant array is instead the display basis set for the monitor of the end user. The difference between the camera basis set and the display basis set is that the camera basis set uses a perfect monitor to capture inherent distortions for any camera, while the display basis set uses an arbitrary monitor of the end user to measure distortions therein.

One condition for constructing both the camera basis set and display basis set is linear independence. Linear independence dictates that any two illuminated pixels or groups of pixels do not share an identical response from the camera. The response of each illuminated pixel which is the stored "image" has a unique set of pixel locations and associated intensities. Linear independence guarantees that each pixel position is evaluated separate and distinct of others so that the curvature of the monitor, lens to monitor angles, lighting, etc. are accounted for on a pixel-by-pixel basis. Linear independence guarantees that the fitting process will produce a single and unique result.

Figure 4:
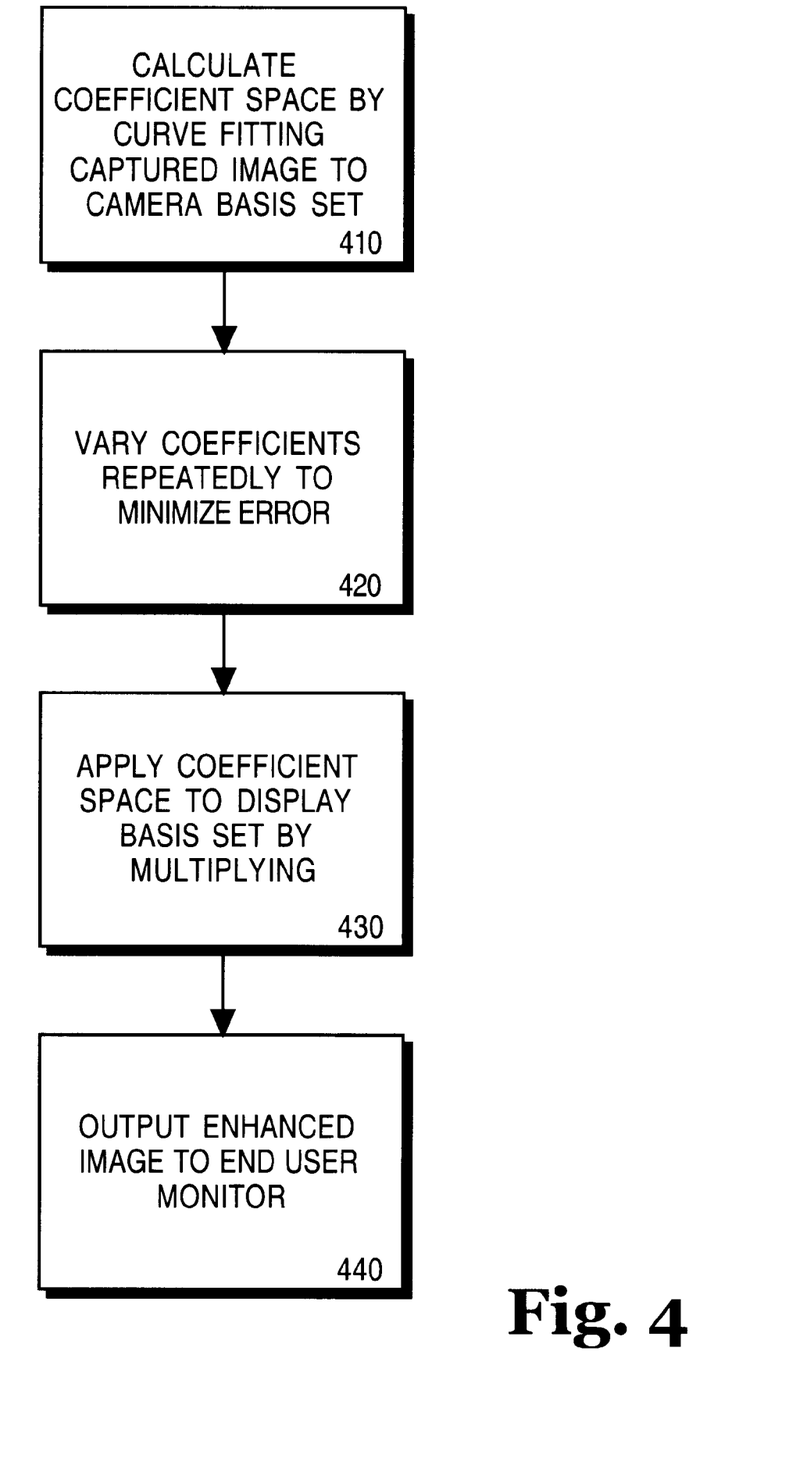
FIG. 4 shows a flowchart of enhancing a captured image.

FIG. 4 shows a flowchart of enhancing a captured image.

Once a display basis set is constructed by the end user, a coefficient space can be calculated for a captured image. The coefficient space can be obtained by fitting the camera basis set, which is supplied to the end user from the factory, to the captured image (step 410). There are a variety of different conventional procedures which may be employed for curve fitting. One conventional example is a "least squares" curve fitting. The least squares curve fit for one embodiment of the invention is represented mathematically as the minimization of the following equation:

$$e = \Sigma_i (F(x,y) - A_i * B_i(x,y))^2.$$

In the above equation, $F(x,y)$ is a function representing the captured image, $B_i(x,y)$ is the camera basis set and $A_i$, the coefficient space representing the parameters of the fit. The quantity e represents the error between the image function and the camera basis set and the fit has been applied. To achieve an enhanced image, the quantity e must be minimized which can be achieved by varying the coefficients of fit $A_i$. To enhance a captured image under this embodiment, the differential equation $\partial e/\partial A_i = 0$ must be solved and/or approximated as close as possible. In a computer-implemented curve fit, a conventional numerical method such as "Direction Set (or Powell's) Methods in Multidimensions" or "Conjugate gradient Methods in Multidimensions" can be employed to solve the differential equation. The error e can be reduced by repeatedly varying the coefficients constituting the coefficient space (step 420).

The basic expression defining an enhanced image I is:

$$I = \Sigma_i A_i * D_i(x,y)$$

for all x,y defined by the pixel resolution of the display monitor which formed $D_i(x,y)$, the display basis set for the monitor of the end user. The coefficient space, solved for and obtained from the differential equation $\partial e/\partial A_i = 0$, when multiplied by the display basis set in this manner will yield a resulting enhanced image that corrects both for distortions due to the camera and distortions due to the monitor. The distortions due to the camera are accounted for by the process of fitting and the distortions due to the display (monitor) of the end user are accounted for applying the coefficient space to the display basis set (step 430). The resulting enhanced image I will be output on the monitor (step 440) and should have greater clarity, sharpness and dimensional realism relative to what the camera should have captured.

Figure 5:
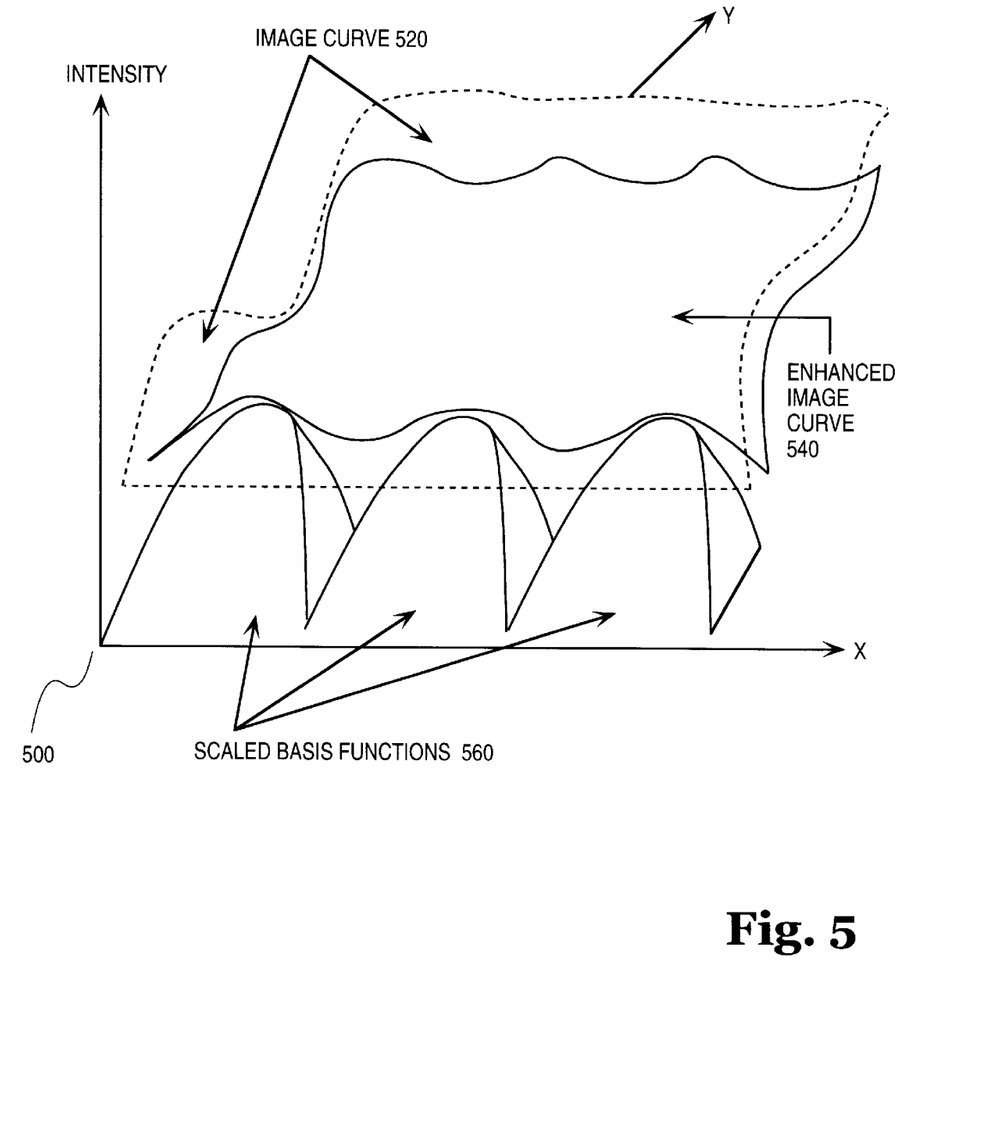
FIG. 5 is a graph of exemplary image functions, display, camera basis sets and enhanced image functions.

FIG. 5 is a graph of exemplary image functions, display, camera basis sets and enhanced image functions.

FIG. 5 shows a graph 500 where the vertical axis represents intensity and the horizontal axis the x-coordinate of the pixel whose intensity is being graphed. The y-axis, shown going into the paper represents the y-coordinates of the pixels whose intensity is being graphed. Graph 500 consists of three curves—an image curve 520, an enhanced image curve 540 and a basis curve 560. Image curve 520 is a plane representing the intensity values captured by a camera. Scaled basis functions 560 represent the display basis set scaled by the best (in terms of least error) attainable coefficient space (set of coefficients calculated from captured image and camera basis set). The enhanced image curve 540 is a function which is produced by summing the scaled basis functions 540 and is an amalgam of the display basis set, camera basis set and original captured image (image curve 520). The enhanced image curve 540 therefore accounts for errors and distortions in both camera and end user monitor.

FIG. 6 illustrates a system diagram according to one embodiment of the invention.

A digital camera 610 which is capable of taking photographs and storing them in digital form is coupled to a computer system 650. Computer system 650 is coupled to an end user monitor 640 which has an associated display basis set 660 which may be stored on a disk 653 coupled to bus 651 transacting data between various components of computer system 650. Computer system 650 has a memory 652 coupled to bus 651 and directly to CPU (Central Processing Unit) 655 which is also coupled to bus 651. Digital Camera 610 interfaces with computer system 650 through a capture card 650 which allows a digital image from the lensing system of camera 610 to be stored in a computer readable format. Alternatively, digital camera 610 can be interfaced with computer system 650 through the use of an I/O port (not shown) such that no capture card is required.

After the display basis set 660 and a camera basis set are loaded for use by computer system 650, image enhancement according to one embodiment of the invention operates as follows. Camera 610 takes a photograph of original object 600 and sends a captured image 612 to computer system 650. If camera 610 is a digital video camera, such as a QuickCam™ by Connectix Corp., a capture card 615 can be coupled between camera 610 and bus 651 to capture frames of video that can individually be enhanced. The captured image 612 may be stored on disk 653 or memory 652 (or other memory) for manipulation by CPU 655. Using the camera basis set and captured image 612, CPU 655 executes instructions to calculate a coefficient space. The coefficient space can be further optimized by error minimization, as described above with respect to FIG. 4. The coefficient space is applied to the display basis set 660 and each resultant intensity location for a pixel is output to end user monitor 640 as enhanced image 670. The instructions executed by the CPU 655 are executed and intermediate results are written to/read from memory 652. Memory 652 may also temporarily store captured image 612, display base set 660 or the camera basis set in order to speed the execution of instructions. Also, FIG. 6 shows a primary video controller 653 which processes image information, such as data for the enhanced image, from memory 652 and other components generating graphical data as pixels output by monitor 640. The enhancement of images according to the steps shown in FIGS. 3 and 4 and the associated description can be readily implemented by one of ordinary skill in the art of computer systems given the teachings herein.

What is claimed is:

1. A method for calibrating a digital camera comprising the steps of:

constructing a camera basis set representing distortions due to a quality of the imaging system of said digital camera based on the response of said digital camera to the illuminating of pixels on a reference monitor;

constructing a display basis set representing distortions due to a quality and characteristics of end user monitor based on the response of said digital camera to the illuminating of pixels on said end user monitor, said display basis set being a function of said camera basis set and said response of said digital camera to said end user monitor; and calibrating said camera according to said display basis set.

2. A method according to claim 1 wherein the step of constructing a camera basis set includes the steps of:

tethering said camera to a computer system outputting images on said reference monitor;

positioning said camera in front of said monitor such that the field of view of said camera can completely capture the viewable surface of said reference monitor;

illuminating a pixel displayed by said reference monitor using said camera; and recording on said computer system the image response of said camera to said illuminated pixel.

3. A method according to claim 2 wherein the steps of illuminating and recording are repeated for all pixels viewable on said reference monitor, the entire set of responses for all said pixels viewable on said reference monitor constituting said camera basis set.

4. A method according to claim 1 wherein the step of constructing a display basis set includes the steps of:
   tethering said camera to a computer system outputting images on said end user monitor;
   positioning said camera in front of said end user monitor such that the field of view of said camera can completely capture the viewable surface of said end user monitor;
   illuminating a pixel displayed by said end user monitor using said camera; and
   recording on said computer system the response of said camera to said illuminated pixel.

5. A method according to claim 4 wherein the steps of illuminating and recording are repeated for all pixels viewable on said end user monitor, the entire set of responses for all said pixels viewable on said end user monitor constituting said display basis set.

6. A method for enhancing an image captured by a camera to be displayed on a end user monitor, said camera having a camera basis set, comprising the steps of:
   constructing a display basis set for said end user monitor;
   constructing a coefficient space by curve fitting said captured image with said camera basis set; and
   applying said coefficient space to said display basis set to construct an enhanced image, said enhanced image to be displayed on said end user monitor.

7. A method for enhancing according to claim 6 wherein the step of constructing a coefficient space includes the steps of:
   curve fitting a function representing the captured image to said camera basis set, said curve fitting resulting in a set of coefficients; and
   repeating the step of curve fitting to minimize, by least squares, the error between the captured image and said set of coefficients, the final set of coefficients obtained constituting the coefficient space.

8. A method for enhancing according to claim 6 wherein the step of applying said coefficient space includes the step of:
   multiplying said display basis set by said coefficient space for the entire captured image, the product constituting said enhanced image.

9. A system for calibrating a digital camera to produce an enhanced image displayed on a end user monitor comprising:
   a memory coupled to said camera to receive a captured image from said camera, said memory configured to store said captured image in digital form, said memory configured to receive a camera basis set;
   a processor coupled to said memory to receive said camera basis set and to construct a display basis set, said processor configured to construct a coefficient space, said coefficient space constructed by curve fitting said camera basis set and said captured image, said processor coupled to said end user monitor to output said enhanced image by applying said display basis set to said coefficient space.

10. A system for calibrating a digital camera according to claim 9 further comprising a bracketing device adapted to hold said camera in front of said end user monitor for constructing said display basis set.

11. A system for calibrating a digital camera according to claim 9 further comprising a disk coupled to said memory, said disk configured to store said camera basis set and said display basis set.

12. A system for calibrating a digital camera according to claim 9 wherein said camera basis set represents distortions due to the quality of the imaging system of said camera.

13. A system for calibrating a digital camera according to claim 9 wherein said display basis set represents distortions due to the quality and characteristics of said end user monitor.

14. A system for calibrating a digital camera according to claim 9 wherein said processor is configured to implement numerical methods to construct said coefficient space.

* * * * *

UNITED STATES PATENT AND TRADEMARK OFFICE
CERTIFICATE OF CORRECTION

PATENT NO.   : 5,918,192
DATED        : June 29, 1999
INVENTOR(S)  : Tomaszewski It is certified that error appears in the above-identified patent and that said Letters Patent is hereby corrected as shown below:

Column 4,
Line 16, delete "(step 32))" and insert -- (step 320) --.

Signed and Sealed this

Eleventh Day of March, 2003

JAMES E. ROGAN
*Director of the United States Patent and Trademark Office*